UNITED STATES PATENT OFFICE 2,054,054

WELDING ELECTRODE FOR MAGNESIUM AND ITS ALLOYS

Donald E. Jarman, Midland, Mich., assignor to The Dow Chemical Company, Midland, Mich., a corporation of Michigan No Drawing. Application December 23, 1935, Serial No. 55,846

5 Claims. (Cl. 219—8)

The invention relates to welding metals. It particularly concerns an electrode for arc welding magnesium and its alloys.

Heretofore magnesium and its alloys have been welded by melting a welding rod of magnesium or alloy thereof into the work using a flame such as that produced by the acetylene torch. A special flux consisting of a mixture of the chlorides of alkali and alkaline earth metals is applied to the work and the rod to protect them from oxidation during welding. The highly oxidizable nature of magnesium at its fusion point makes it practically impossible to produce welds in this metal that are free from oxide inclusions without using a suitable protective flux. On the other hand, the use of such a protective flux results in a corrodible weld, due to the fact the weld invariably occludes traces of the flux the constituents of which are corrosive to magnesium, especially in the presence of moisture. Difficulties are encountered also in attempting to make welds by the use of an electric arc struck between the work and an electrode of magnesium or a magnesium alloy. In this case no flux capable of protecting the metal from oxidation is known that does not interfere with the functioning of the electric arc. The welds produced by the arc without flux are poor, due to excessive oxidation and occlusion of products of oxidation by the weld.

A particular object of the invention is to provide a welding electrode for producing sound welds in magnesium and its alloys by means of the electric arc. Another object is to eliminate the use of a flux in the welding operation. Other objects and advantages will appear as the description proceeds.

My invention is predicated upon the discovery that, by applying a metal sheath or coating containing certain metals, specifically aluminum, cadmium, tin, or zinc, to a magnesium or magnesium alloy rod to form an electrode, the arc struck between the work and the electrode causes the welding metal to melt down into the weld with no consequential amount of oxidation. I have thus found that welds can be made in magnesium and magnesium alloys by means of the electric arc and without the use of a flux, which welds have a strength comparable to those produced by the torch method using a flux, but without its disadvantages. The invention, then, consists of the welding electrode hereinafter fully described and particularly pointed out in the claims.

The term "magnesium" is used herein and in the appended claims to mean pure magnesium and alloys thereof containing a predominating amount of magnesium, and the terms "aluminum", "cadmium", "tin", and "zinc" are used in similar manner to mean one of the pure metals respectively or an alloy of such a metal containing the same in a predominating amount.

In carrying the invention into effect I employ a magnesium bar, rod or the like of suitable diameter, such as ⅛ to ¼ inch more or less, which serves as a core, and apply thereto a sheath of one of the foregoing metals, as a foil or coating. The thickness of the sheath may vary over a considerable range, such as from 0.001 to 0.01 inch. However, it is preferable when the magnesium base alloy to be welded contains one of the metals aluminum, cadmium, tin, or zinc, as is usually the case, to choose the thickness of the metal sheath such that the ratio of the cross sectional area of the sheath to that of the rod is substantially the same as the ratio of the amount of these metals in the alloy. Strict adherence to such ratio, however, is not essential, for good results can be had for example by using the sheathed electrode for welding magnesium and alloys thereof that do not contain a metal of which the sheath is made.

The metal sheath may be applied to the magnesium core in various ways. A convenient procedure is to produce a coating of the metal on the rod by means of the Schoop metal spray method. Another procedure is to wrap foil or ribbon of the sheathing metal around the magnesium core. The particular mode of applying the metal sheath or coating is immaterial. It is sufficient if the core or rod of magnesium or magnesium base alloy be encased in a sheath or coating of aluminum, cadmium, tin, or zinc, or an alloy containing such metal in predominating amount. If desired two or more of such metals may be alloyed together to produce the coating metal.

The electrode may be used in similar manner to that employed in arc welding ferrous metals, the work being made the negative pole preferably. For a magnesium electrode of the foregoing character ¼ inch in diameter and having a metal sheath 0.003 to 0.007 inch thick a current of between 135 and 175 amperes is suitable which is obtainable with about 40 volts potential across the arc. If desired alternating current may be used, however, better results have been obtained by using direct current.

In making comparative welding tests I employed cast magnesium alloy (10% Al, 0.1% Mn, balance Mg) plates ¼ inch thick having straight beveled edges. Test welds were made in a pair of plates butted together by striking an arc between a welding electrode and the beveled edges of the plates which were made the cathode. The weld was started at one end of the abutting edges and continued as regularly as possible, producing a "bead" which was about 50% thicker than the plates. The bead was then ground off flush with the plates. Tensile strength specimens about 1 inch wide were cut from the plates transversely to the weld so that the welds could be put in tension to determine their tensile strength.

When a plain magnesium or magnesium alloy welding electrode ¼ inch thick was employed in the foregoing tests, using about 150 amperes, the strength of the welds averaged about 15,300 lbs. per square inch. The minimum tensile strength of the cast plates alone (outside the weld) was 18,000 lbs. per square inch. In comparison with these results I found that, by using a welding electrode having a round magnesium core ¼ inch in diameter sheathed with aluminum foil 0.007 inch thick according to the invention as an example thereof, the strength of the test specimens averaged about 19,300 lbs. per square inch, the specimens breaking usually outside the weld. As a further example of the invention a similar series of tests were made with a magnesium rod coated with aluminum 0.003 inch thick by the Schoop metal spray method. The welds so produced showed an average strength of 19,600 lbs. per square inch. Similar improved results have been obtained when an aluminum base alloy is employed for the sheath or coating. With welding electrodes formed from a magnesium alloy (0.2% Mn, balance magnesium) rod ¼ inch thick coated by the Schoop metal spray method with cadmium 0.01 inch, the welds produced showed an average tensile strength exceeding that of the cast magnesium alloy plates. Similar results were obtained with sprayed coatings of tin and zinc applied to similar magnesium alloy rods.

Thus by applying a coating or sheath comprising one of the metals aluminum, cadmium, tin, and zinc to a magnesium or magnesium base alloy welding rod a superior welding electrode is obtained by means of which sound strong welds can be made in magnesium and its alloys by the electric arc method without the use of a flux. Since with my improved welding electrode a welding flux need not be employed, the welds produced resist corrosion to a much greater degree than welds produced in conventional manner with flux.

Other modes of applying the principle of my invention may be employed instead of those explained, change being made as regards the materials employed, provided the materials stated by any of the following claims or the equivalent of such stated materials be employed.

I therefore particularly point out and distinctly claim as my invention:—

1. An electrode for arc welding magnesium and its alloys comprising a magnesium core and a sheath comprising a metal selected from the group consisting of aluminum, cadmium, tin, and zinc.

2. An electrode for arc welding magnesium and its alloys comprising a magnesium core and an alloy sheath containing a predominating amount of a metal selected from the group consisting of aluminum, cadmium, tin, and zinc.

3. An electrode for arc welding magnesium and its alloys comprising a magnesium core and an aluminum sheath.

4. An electrode for arc welding magnesium and its alloys comprising a magnesium alloy core and an aluminum sheath.

5. An electrode for arc welding magnesium and its alloys comprising a magnesium core encased in relatively thin sheath of aluminum foil.

DONALD E. JARMAN.